United States Patent
Roemhild et al.

(10) Patent No.: US 7,818,891 B2
(45) Date of Patent: Oct. 26, 2010

(54) INCLINATION SENSOR WITH OPTOELECTRONIC LEVEL

(75) Inventors: Dieter Roemhild, Erfurt (DE); Gerd Freydank, Goettingen (DE); Herbert Rink, Goettingen (DE); Olaf Brodersen, Erfurt (DE); Ralf Mueller, Mittweida (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 12/473,886

(22) Filed: May 28, 2009

(65) Prior Publication Data
US 2009/0293297 A1 Dec. 3, 2009

Related U.S. Application Data

(63) Continuation of application No. PCT/EP2007/008406, filed on Sep. 27, 2007.

(30) Foreign Application Priority Data
Nov. 28, 2006 (DE) ........................ 10 2006 056 072

(51) Int. Cl.
*G01C 9/06* (2006.01)
(52) U.S. Cl. .................................................. 33/366.16
(58) Field of Classification Search ............... 33/366.16, 33/366.23
See application file for complete search history.

(56) References Cited

U.S. PATENT DOCUMENTS

| | | | | |
|---|---|---|---|---|
| 3,324,564 A | * | 6/1967 | Wright et al. ............. | 33/366.16 |
| 3,464,276 A | * | 9/1969 | Leibert ..................... | 73/514.09 |
| 4,164,077 A | * | 8/1979 | Thomas ..................... | 33/348 |
| 4,589,730 A | * | 5/1986 | Obu .......................... | 359/228 |
| 4,956,922 A | * | 9/1990 | Bodewes ................... | 33/366.16 |
| 5,761,818 A | * | 6/1998 | Hopkins et al. .......... | 33/366.14 |
| 5,794,355 A | * | 8/1998 | Nickum .................... | 33/366.16 |
| 6,343,422 B1 | * | 2/2002 | Takahashi ................. | 33/366.16 |
| 6,647,634 B2 | * | 11/2003 | Yang et al. ................ | 33/390 |
| 7,497,021 B2 | * | 3/2009 | Perchak et al. ........... | 33/366.16 |
| 7,526,870 B2 | * | 5/2009 | Klapper et al. ........... | 33/366.23 |
| 2007/0193048 A1 | * | 8/2007 | Molitorisz ................ | 33/366.16 |

FOREIGN PATENT DOCUMENTS

| | | |
|---|---|---|
| DE | 36 34 244 A1 | 4/1988 |
| DE | 39 38 848 A1 | 5/1991 |
| DE | 198 54 812 A1 | 8/1999 |
| JP | 10227635 | 8/1998 |
| WO | WO 2007/059736 A1 | 5/2007 |

* cited by examiner

*Primary Examiner*—Christopher W Fulton
(74) *Attorney, Agent, or Firm*—Muncy, Geissler, Olds & Lowe, PLLC

(57) ABSTRACT

An inclination sensor is provided having a level that has a liquid and a gas bubble under a covering glass in a housing. A light source is arranged above the covering glass. The inclination sensor can be used to determine a direction and degree of an inclination with high accuracy and which is suitable for automatically aligning an apparatus provided with the inclination sensor. An arrangement is provided that has at least two light receivers arranged above the covering glass such that the light that is emitted from the light source and, in the case of a centered gas bubble, is scattered on the surface of the covering glass coming in contact with the gas bubble can be detected by the at least two light receivers. Different quantities of light can be detected by the light receivers when the gas bubble is not centered, and the light source and the light receivers are arranged on a chip substrate.

21 Claims, 3 Drawing Sheets

INCLINATION SENSOR WITH OPTOELECTRONIC LEVEL

This nonprovisional application is a continuation of International Application No. PCT/EP2007/008406, which was filed on Sep. 27, 2007, and which claims priority to German Patent Application No. 10 2006 056 072.8, which was filed in Germany on Nov. 28, 2006, and which are both herein incorporated by reference.

BACKGROUND OF THE INVENTION

1. Field of the Invention

The invention relates to an inclination sensor with a level that has a liquid and a gas bubble under a cover glass in a housing, wherein a light source is arranged above the cover glass.

2. Description of the Background Art

Levels are customarily used for horizontal or vertical orientation of apparatuses such as measurement instruments or in construction, for example. These levels usually take the form of tube-type levels for one-dimensional orientation, or circular levels for two-dimensional orientation. The level is attached to the apparatus such that its gas bubble is located at a defined location in the level when the apparatus is in the oriented state. The oriented state can be established or reestablished with little effort using the level. The oriented state of the apparatus need not necessarily be horizontal or vertical. In principle, any desired angle of inclination can be specified for the oriented state by an appropriately tilted arrangement of the level on the apparatus.

When the gas bubble is in the defined location, it is referred to for the purposes of the invention as being centered.

In order to achieve a stable and reproducible position of the bubble as a function of the level's angle of tilt, in the prior art the interface between the cover glass and liquid is manufactured with a concave contour. The sensitivity of the level then depends primarily on the radius of curvature of the cover glass.

Arrangements are already known in the conventional art with which levels can be read electronically. Photoelectric principles are generally employed for this purpose. The majority of conventional art arrangements are based on transilluminating a level, wherein a light source and a photodetector are arranged on opposite sides of the level, in particular on the top and bottom.

For example, an inclination sensor containing a conventional tube-type level is described in DE 39 38 848 A1 whose housing consists of a light-transmitting material and whose interior is filled with a liquid surrounding a gas bubble. Located above the tube-type level is a light source that illuminates the entire length of the level. The light emerging from the light source passes through the transparent housing and through the likewise light-transmitting liquid and also through the gas bubble. A nonuniform light distribution is produced on the side of the level opposite the light source, and is analyzed by a photodetector located thereunder. Such devices are expensive, require a large amount of space, and generally require specially designed levels. Major disadvantages include the small difference in brightness of the light spot that is to be analyzed, resulting from the low difference in transmission of the gas bubble and liquid, as well as the washed-out contours of the light spot resulting from reflection and scattering effects at the optical interfaces. Sensing of the position of the light spot is thus subject to considerable uncertainties, and permits only small bubble excursions for unambiguous interpretation of the photocurrent signals.

Known from DE 36 34 244 A1 is an optoelectronic inclination sensor with a radiation emitter and a radiation detector, in which the radiation emitter and radiation detector are located above a light-reflecting medium, wherein the inclination is detected by reflection at a light-reflecting liquid, preferably at a mercury surface. The liquid is enclosed in a capsule that is only partially filled by the liquid. Detection of the position of a gas bubble is not possible with this arrangement.

Moreover, there is known from JP 10 227 635 A an inclination sensor in which a light source and a photodetector are arranged on the same side of a level, namely above the cover glass. This inclination sensor utilizes the principle of total internal reflection. When the level's orientation is horizontal, which is to say when the gas bubble is centered as defined for the purposes of the invention, the light from the light source incident on the gas bubble is totally internally reflected toward the photodetector at the interface between the optically denser cover glass and the optically less dense gas bubble. The light that is totally internally reflected in the centered case can be detected by means of the photodetector. If the gas bubble is off-center, no total internal reflection takes place, and thus no light incidence on the photodetector. It is thus possible to determine whether or not the gas bubble is centered using the detectable light. This serves as a binary indication of a horizontal, vertical, or other predefined orientation of an apparatus. This inclination sensor has the disadvantage that the direction and amount of inclination cannot be determined. Automatic orientation of an apparatus equipped with such an inclination sensor is not possible. Moreover, it is disadvantageous that the proportion of total internal reflection is only effective at adequately long distances between the light emitter and detector, which results in large, and hence costly, sensors. Depending on the dimensions of the level and the desired dynamic range (tilt angle), the use of total internal reflection at the contact surface between bubble and glass can even become ineffective.

SUMMARY OF THE INVENTION

It is therefore an object of the present invention to provide an inclination sensor by means of which the direction and amount of inclination can be determined with high precision, and which is suitable for automatic orientation of an apparatus equipped with such an inclination sensor.

A principle of operation according to an embodiment is based on the demonstration of the change in the light distribution caused by the bubble displacement as a result of Fresnel reflection and/or scattered light generation at the optically smooth or microrough contact surface between the gas bubble and the underside of the cover glass.

One effective measure for efficiently increasing the proportion of light diffusely reflected from the contact area between the gas bubble and glass is microrough surface finishing, similar to a ground-glass screen. A microrough surface for the purpose of the invention is present when the effective surface roughness is greater than 1 µm, and may be produced by conventional methods such as grinding, sandblasting, or etching. Outside the contact area between the gas bubble and the glass, the difference in refractive index between the glass and liquid is generally so small that the "ground-glass screen effect" vanishes and no significant proportion of scattered light is generated.

The microroughness of the underside of the cover glass, in conjunction with the inventive arrangement, includes the following described significant advantages. The lateral sensor dimensions and the manufacturing costs associated therewith can be drastically reduced. In contrast to total internal reflection, scattered light is produced even in the region of highest brightness of the light source. A very good signal-to-noise ratio and high detection sensitivity are achieved by this means. The undesirable effect of temperature changes on the reproducibility of the inclination measurement is considerably reduced as compared to the total internal reflection method pursuant to JP 10 227 635 A, since the relative change in the light-emitting contact area between the gas bubble and cover glass as a result of a temperature variation will always be smaller than the relative change in the totally internally reflected light emerging from an area in the shape of a ring or strip at the outer circumference of said contact area. The proportions of light coming from the light source that are transmitted forward through the contact area between the gas bubble and cover glass are reflected at the spherical inner surface of the gas bubble in a manner similar to the operating principle of the prior art integrating sphere, and thus additionally contribute to the production of scattered light at the microrough interface between the bubble and glass.

An embodiment provides that the housing has a light-absorbing surface on the inside to suppress interfering scattered light from the walls of the level.

For applications in which monochromatic light is used, the use of a liquid that absorbs the operating wavelength is a highly effective solution. In the event that the liquid itself is not absorbent or is not sufficiently absorbent, suitable highly absorbent dyes can be used. The fact that the effective absorption paths in the level are doubled by the passage back and forth is advantageous in this regard.

Since a difference in refractive index between the glass of the level and the liquid is always counterproductive for the purpose of the invention, the best possible matching of the refractive indices of the glass of the level and the liquid is sought. For example, possibilities include the choice of the material (glass, PMMA, polycarbonate, . . . ), but also the mixing of volume fractions of liquids with suitable refractive index. In particular, a nearly 100% match can be achieved by the mixing of liquids. The mixing can advantageously be combined with tinting of the liquid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
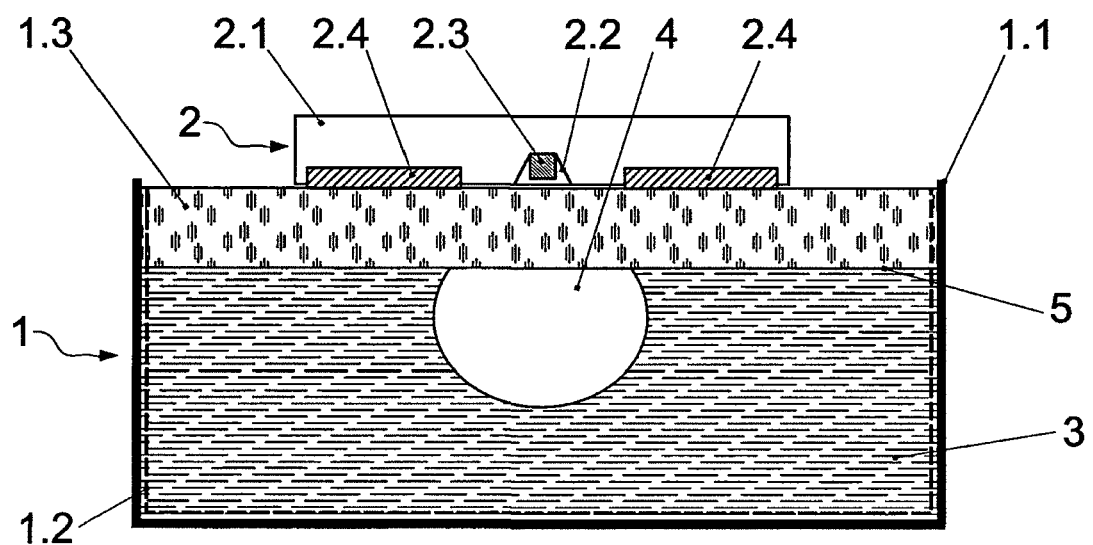
FIG. 1 is a cross-sectional view of an electronic level.

FIG. 1 schematically shows the arrangement as a whole. The arrangement includes a level 1 and a measurement module 2. The level 1 has a housing 1.1, in which are located a liquid 3 and a gas bubble 4. The housing 1.1 is provided with a light-absorbing surface 1.2 on the inside. The liquid 3 contacts a cover glass 1.3 at a glass/liquid interface 5. In a measurement module 2, the optical components are affixed in a chip substrate 2.1. For this purpose, the light source 2.3, which can be an LED, is located in a recess 2.2. The photodetectors 2.4 are located on the surface of the chip substrate 2.1 at approximately equal distances from the light source.

Figure 2:
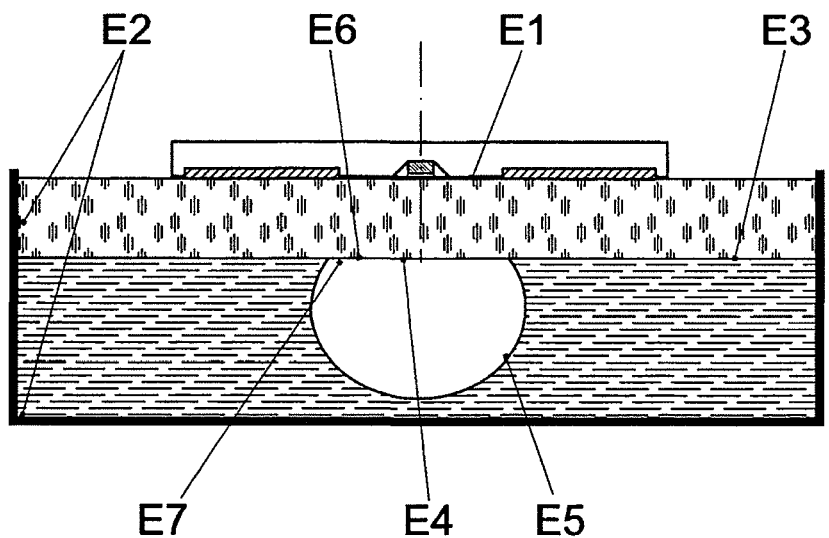
FIG. 2 is a representation of the optical mechanisms on the electronic level.

FIG. 2 illustrates the optical effects that influence the operation of the electronic sensor. It is important here to distinguish between undesirable parasitic effects and useful effects.

The undesirable effects include:

E1: Direct optical cross-talk between the light source (LED) and photodetector (PIN diode).

E2: Specular or diffuse reflection on the bottom and the walls of the level vial and at the edge of the cover glass.

E3: Fresnel reflection or generation of scattered light at the interface between the cover glass and liquid for unequal refractive indices.

The useful effects include:

E4: Fresnel reflection at optically flat interfaces, and/or generation of scattered light at microrough interfaces, between the cover glass and gas bubble.

E5: Fresnel reflection at the inner surface of the gas bubble.

E6: Total internal reflection at the interface between the glass and gas bubble when the critical angle condition is exceeded.

E7: Total internal reflection at the meniscus of the gas bubble.

For the present invention, effects E4 and E5, namely, Fresnel reflection at an optically flat interface and/or generation of scattered light at microrough interfaces, are exploited. The underside of the cover glass 1.3 serves as an effective interface in the region where the gas bubble 4 touches the underside of the cover glass 1.3.

Figure 3:
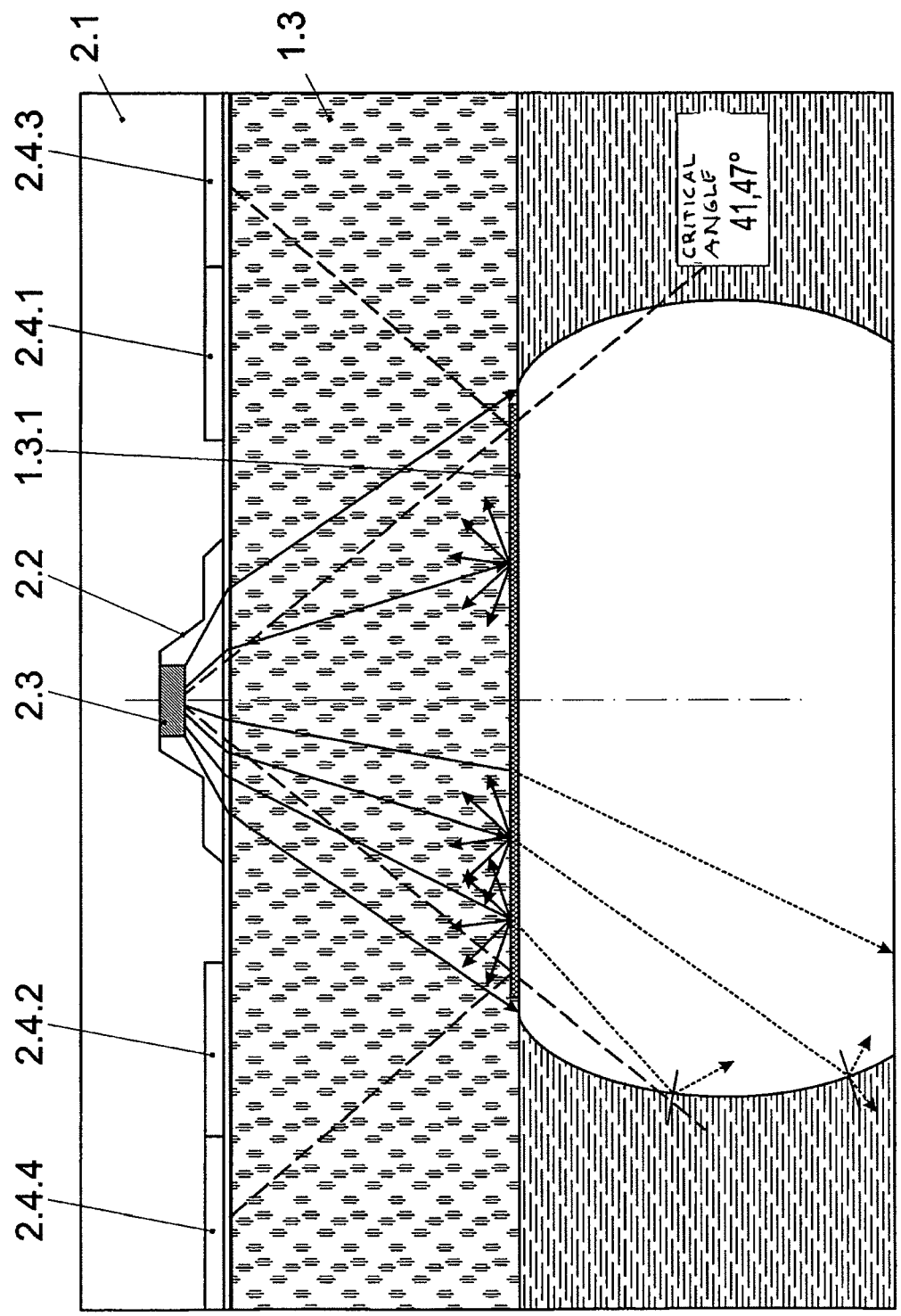
FIG. 3 is an illustration of the scattering effect.

FIG. 3 illustrates the scattering effect that occurs at the underside of the cover glass 1.3. The illuminating rays emerging from the light source 2.3 are reflected at the underside of the cover glass 1.3. An LED preferably serves as the light source here. Illuminating rays incident at an angle that is below the critical angle of total internal reflection are diffusely reflected and produce a light spot on the measurement module 2 that can be evaluated with high precision. It is advantageous here that the diffusely reflected light can be detected by the detectors 2.4.1 and 2.4.2, which may be located relatively close to the light source 2.3, while the totally internally reflected light strikes the photodetectors 2.4.3 and 2.4.4, which must be located further to the outside. The arrangement with evaluation of total internal reflection thus requires larger dimensions of the chip substrate 2.1 as compared to an arrangement with evaluation of scattered light, and thus entails higher costs. Since the production of scattered light takes place in the region of highest brightness of the light source 2.3, a very good signal-to-noise ratio, and thus high detection sensitivity, are achieved.

Figure 4:
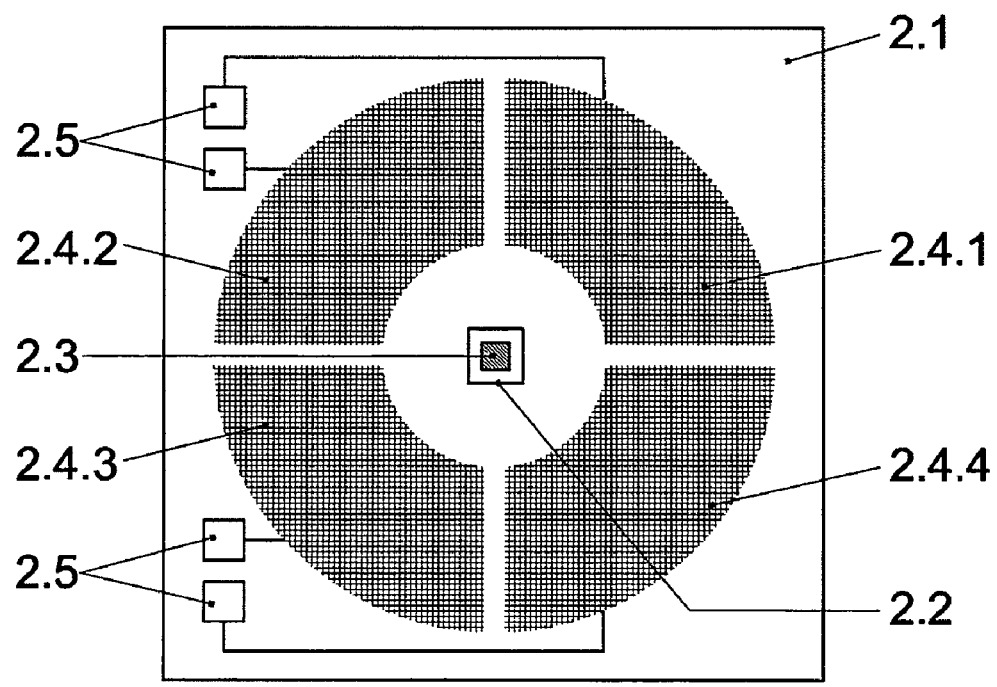
FIGS. 4 and 5 illustrate a top view of a chip substrate.

The measurement module 2 has a chip substrate 2.1. FIG. 4 shows a top view of the functional top of the chip substrate. The chip substrate 2.1 is provided with a recess 2.2 in which are integrated, essentially along a plane, a light source 2.3 in the form of an LED and four photodetectors 2.4.1, 2.4.2, 2.4.3, 2.4.4 in the form of photodetectors having the shape of segments of a circular ring. The circular ring segments cover four quadrants of a two-dimensional area. The recesses 2.2 prevent direct optical cross-talk from the light source 2.3 to the photodetectors 2.4. The electrical lines to the external terminals 2.5 of the light source 2.3 and to the photodetectors 2.4 are located on the chip substrate 2.1 and are connected thereto by terminal areas (2.5). For reasons of clarity, the terminal of the light source 2.3 is not shown. The chip substrate 2.1 may be applied directly to the cover glass 1.3 or may be cemented with a glass substrate that is located between the cover glass 1.3 and chip substrate 2.1, and that forms an optical unit with the cover glass (1.3).

Figure 5:
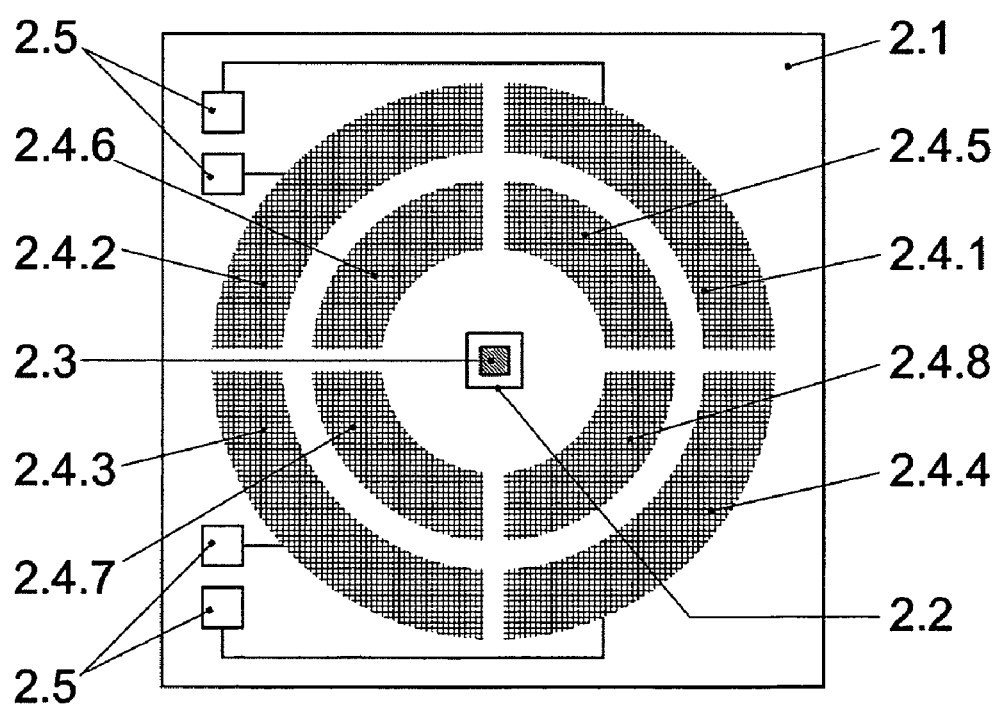

In the embodiment shown in FIG. 5, the photodetectors 2.4 are subdivided once again in the radial direction, so that the arrangement contains a total of eight individual segments 2.4.1 to 2.4.8. A further improvement in resolution can be achieved in this way.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An inclination sensor comprising:
   a level that has a liquid and a gas bubble under a cover glass in a housing;
   a light source arranged above the cover glass; and
   at least two photodetectors arranged above the cover glass so that light emerging from the light source and scattered at a surface of the cover glass contacting the gas bubble when the gas bubble is centered is detected by the at least two photodetectors,
   wherein, when the gas bubble is off-center, different quantities of light is detected by the photodetectors,
   wherein the light source and photodetectors are arranged on a common chip substrate,
   wherein the chip substrate is arranged with a functional side on the cover glass or on a glass substrate that forms an optical unit together with the cover glass, and
   wherein a side of the cover glass facing the fluid chamber has a microroughness.

2. The inclination sensor according to claim 1, wherein at least four photodetectors are arranged around the light source in such a manner that light, which emerges from the light source and is reflected and/or scattered at the surface of the cover glass contacting the gas bubble when the gas bubble is centered, is detected by the at least four photodetectors.

3. The inclination sensor according to claim 1, wherein the light source is centrally located over the gas bubble when the gas bubble is centered.

4. The inclination sensor according to claim 1, wherein the photodetectors are segmented in a plane parallel to the cover glass along virtual lines passing through the light source and the relevant photodetectors, wherein reflected and/or scattered light is detected by these segments independently of other respective segments.

5. The inclination sensor according to claim 1, wherein the housing has a light-absorbing surface on an interior thereof.

6. The inclination sensor according to claim 1, wherein the light source emits monochromatic light, and a liquid in the level is used that absorbs light of this wavelength.

7. The inclination sensor according to claim 6, wherein the liquid is provided with dyes that carry out absorption in the wavelength range of the light source.

8. The inclination sensor according to claim 1, wherein, in order to reduce the difference in refractive index between the cover glass and the liquid, materials are used for the cover glass that approach the index of refraction of the liquid.

9. The inclination sensor according to claim 1, wherein, in order to reduce the difference in refractive index between the cover glass and the liquid, the index of refraction of the liquid is adjusted by mixing of volume fractions of different liquids.

10. The inclination sensor according to claim 1, wherein a material is selected such that the index of refraction of the cover glass at or near the index of refraction of the liquid, in order to reduce a difference in refractive index between the cover glass and the liquid.

11. An inclination sensor for determining a direction and an amount of inclination comprising:
    a housing defining a fluid chamber that holds a liquid and a gas bubble under a cover glass in the housing, a side of the cover glass facing the fluid chamber having a micro roughness;
    a light source arranged above the cover glass; and
    photodetectors in a shaped arrangement above the cover glass so that at least first components of light emerging from the light source and scattered at a surface on the side of the cover glass facing the fluid chamber and contacting the gas bubble and reflected from an inner surface of the gas bubble, are detected by the photodetectors,
    wherein the light source and photodetectors are arranged on a common chip substrate having recesses that reduce optical cross-talk between the light source and the photodetectors, and
    wherein the chip substrate is arranged with a functional side optically coupled to the cover glass.

12. The inclination sensor according to claim 11, wherein the photodetectors are further arranged so that the first components of light emerging from the light source and scattered at the surface on the side of the cover glass facing the fluid chamber and contacting the gas bubble and reflected from the inner surface of the gas bubble, are detected by first ones of the photodetectors located closer to the light source, and second components of light emerging from the light source totally internally reflected are detected at least by second ones of the photodetectors located further away from the light source than the first ones.

13. The inclination sensor according to claim 12, wherein the second components include light that is incident at an angle above the critical angle of total internal reflection.

14. The inclination sensor according to claim 11, wherein the first components include Fresnel reflections from the inner surface of the gas bubble.

15. The inclination sensor according to claim 11, wherein the shaped arrangement includes four of the photodetectors arranged in a ring around the light source.

16. The inclination sensor according to claim 11, wherein the photodetectors are segmented in a plane parallel to the cover glass along virtual lines passing through the light source and the relevant photodetectors, wherein reflected and/or scattered light is detected by these segments independently of other respective segments.

17. The inclination sensor according to claim 11, wherein the housing has a light-absorbing surface on an interior thereof.

18. The inclination sensor according to claim 11, wherein the light source emits monochromatic light, and the liquid includes a liquid that absorbs the monochromatic light.

19. The inclination sensor according to claim 11, wherein the liquid is provided with a dye that causes the liquid to absorb light in the wavelength range of the light source.

20. The inclination sensor according to claim 11, wherein the microroughness includes an effective surface roughness is greater than 1 µm.

21. An inclination sensor for determining a direction and an amount of inclination comprising:
    a housing defining a fluid chamber that holds a liquid and a gas bubble under a cover glass in the housing, a surface of the cover glass facing the fluid chamber and contacting the gas bubble having a microroughness; and a light source and an arrangement of photodetectors positioned above the cover glass and integrated on a common chip substrate arranged with a functional side optically coupled to the cover glass;

wherein the photodetectors are arranged around the light source in a segmented ring so that light from a light spot associated with the relative position of the gas bubble within the fluid chamber and produced by at least first components of light emerging from the light source and scattered at the microroughness and reflected from an inner surface of the gas bubble is detected by the ones of the photodetectors closer to the light source.

* * * * *